D. L. V. BROWNE.
MEANS FOR THE PURIFICATION OF WATER.
APPLICATION FILED OCT. 21, 1907.
910,495.
Patented Jan. 26, 1909.
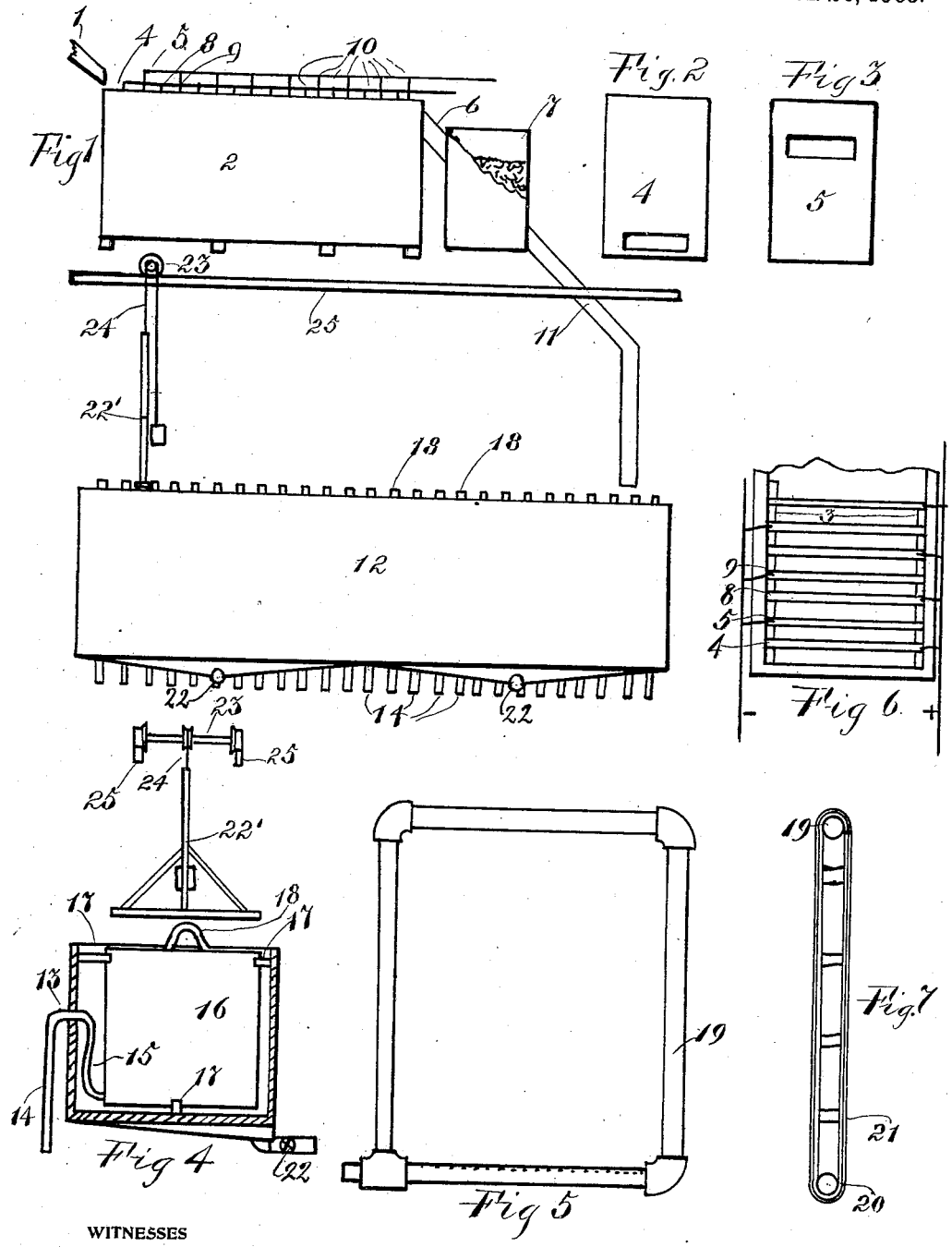

UNITED STATES PATENT OFFICE.

DOUGLAS L. V. BROWNE, OF SAN FRANCISCO, CALIFORNIA, ASSIGNOR TO JAMES B. MILLER, OF SAN FRANCISCO, CALIFORNIA.

MEANS FOR THE PURIFICATION OF WATER.

No. 910,495.      Specification of Letters Patent.      Patented Jan. 26, 1909.

Application filed October 21, 1907. Serial No. 398,446.

*To all whom it may concern:*

Be it known that I, DOUGLAS L. V. BROWNE, a subject of the King of England, residing at San Francisco, in the county of San Francisco and State of California, have invented a new and useful Means for the Purification of Water, of which the following is a specification, in such full and clear terms as will enable those skilled in the art to construct and use the same.

This invention relates to means used for the purpose of purifying water in order to make the same more potable and "soft" as that term is used in connection with water that has no salts which cause it to coagulate hard calcium soaps from the common potassium or sodium soaps. This purification while of great advantage for the prevention of such coagulation is of no less advantage in improving waters for drinking purposes, since the water is freed from objectionable organic substances and salts of the various kinds and kills and entangles the contained bacteria, and the coagulated mass of hydrous oxids formed in the purification of the water will cause the mechanically carried sediments due to light soils over which the water has passed to be taken out as well, since the flocculent mass of hydrous oxids entangles the sediments and causes them to be caught by the filters, a thing that is very difficult to do unless some such means is used to assist in holding the sediments.

Another object of my invention is to produce a filter that will be especially adapted to the work to be done in the given case, and which will be provided with means for cleaning the same at the will of the operator.

In the drawings, in which the same numerals have been applied to the same parts throughout, Figure 1 is a side elevation of my improved water purifier, Fig. 2 is a view in elevation of one of the cathodes used in the electrolytic box, Fig. 3 is a view of one of the anodes, Fig. 4 is an end elevation of the filter box and cleaner showing the interior of the filter box, Fig. 5 is a view of one of the filter frames used, Fig. 6 is a partial plan of the electrolysis box, and Fig. 7 is a vertical section of one of the filter leaves.

The numeral 1 is applied to the feed launder at the head of the electrolysis box 2, said box being provided with a series of grooves formed by cleats 3 in which grooves are placed the anode and cathode plates 4, 5, one set of said plates being provided with holes near the bottom thereof, and the other set with holes near the top thereof, in order to cause the water to travel through the box in a long path and to come into contact with as much plate surface as possible, it being understood the plates are placed in the box in alternate positions. The box 2 is provided with the discharge pipe 6 which leads into a box 7 filled with mineral wool to take out the heaviest of the flocculent materials precipitated by the contact of the water with the plates.

It is well known that the contact of the water and the cathodes and anodes of an electrical system will cause the flocculation of certain of the hydrous oxids of many of the undesirable metals which are carried by the water, but some cathodes cause certain oxids to collect better than others and vice versa, therefore to increase the flocculation of the oxids I use a series of different metals in my electrolysis box, as for example the plate 4 will be made of iron, the plate 5 of zinc, the plate 8 will be made of aluminum, the plate 9 will be made of manganese dioxid or a copper plate may be included in the list. The series may be repeated further down the box, but at the end of the box are placed a number of carbon plates 10. The effect of the carbon plates is to cause the flocculent materials to collect into coagulent masses or bunches which filter out more easily than if the water is run direct to the filter from the metal plates, and in addition the carbon plates give off a certain amount of oxygen, through decomposition of the water which is very beneficial to the water especially where it is to be used for drinking purposes. It will be understood that the materials in the box 2 are connected alternately, as shown in Fig. 6 to the wires of an electric circuit.

When the water leaves the box 2 it passes into the box 7 containing mineral wool which is packed down close enough to catch large masses of the coagulated oxids and thus assist the filter leaves in carrying the load put on them. This filter may be cleaned at will, the wool being taken out and heated to get rid of any materials caught by it, or new wool may be placed in the box. This box has a discharge pipe 11 which leads to the filter box 12. This filter box is simply a tank having a large number of pipes in its side about half way from the top to the bottom, as shown at 13. The pipes 13 extend through the side of the tank 12 and on the outside have connected to them the pipes 14 which lead to any desired receptacle below the tank 12. The pipes 13 are tightly screwed into the holes in the sides of the tank and on the inside of the tank they are connected to the flexible hose 15, said hose being a little longer than one half the depth of the tank, in order that the leaves 16 which constitute the filter may be raised clear of the tank for inspection and repair whenever necessary. The leaves 16 are held in their proper position by means of the fingers 17 on the sides and bottom of the tank 12. If necessary to take the leaves out of the tank altogether all that is necessary to do is to disconnect the hose from the leaf to be taken out and secure the hose above the top of the tank till it is desired to replace the leaf, when it is connected to the new leaf. The object of placing the hose below the top of the water in the filter tank is to avoid the necessity of having any suction apparatus to cause the water to flow from the filter leaf, the water starting to flow as soon as the leaf has filled to the level of the pipe 13 and continuing to flow so long as the tank has any water in it. The leaves have handles 18 attached to them to make it possible to take them out of the filter box with as little trouble as possible.

Each leaf may be made of cast iron, wood or other suitable material as a common pipe frame 19 having holes to the inside of the fabric covering 20, said covering being made of any suitable material, and an outer cover 21 of canvas is placed over the inner cover 20 At the bottom of the frame at one corner is placed a pipe fitting called a T which is connected with the hose 15 through which the water escapes, the materials to be taken out of the water remaining on the outside of the leaves.

In order that the filter may work properly it must be cleaned at frequent intervals and to do this the cleaner 22' is provided. This cleaner is suspended from a carriage 23 by means of a rope 24 a weight 25 holding the cleaner out of the tank when the same is not in use. The carriage is provided with rollers which move along the tracks 25 at the will of the operator, said tracks extending over the filter tank to such an extent as to enable the workman to clean any of the leaves.

It will be understood that the cleaner is pushed down between two leaves and cleans one side of two leaves each time it is pushed to the bottom of the tank. In order to run off the sludge that may be scraped off the leaves the bottom of the tank 12 is inclined and has an escape valve 26 at its lowest side.

It will be understood that if it is desirable covers may be provided for each of the tanks and the entire system may be run under pressure, but it would be necessary to take the covers off to clean the sides of the leaves. It will also be understood that the same kind of a cleaner may be used for the plates in the electrolysis box as for the filter tank, if it is so desired.

It is to be observed further that there is a voltaic effect where such a series of plates as those above disclosed are used in addition to the effect of the current of applied electricity.

It will also be understood that the boxes may be built of various sizes and to take any amount of water, but the filter leaves are commonly made about ten feet square giving two hunderd square feet of filter surface.

The operation of the purifier is as follows: The water is allowed to run into the tank 2, a current of electricity is applied to the electric terminals and the water progresses tortuously through the tank, the metal plates causing the flocculation of the hydrous oxids of the various undesirable metals and entangling the sediment that may happen to be in the water. As the water passes on through that part of the tank containing the carbon plates 10 the flocculation is still further stimulated and a certain amount of oxygen is liberated and entangled in the water. The water then runs into the mineral wool box 7 where masses of the flocculent hydrous oxids are retained and it then passes to the filter box 12 and through the filter leaves to a suitable storage tank.

It will be observed that other than the power required to furnish the current of electricity no power is required to run the filter, all the filtering being done by gravity.

Having thus described my invention what I claim as new and desire to secure by Letters Patent of the United States is as follows, modifications within the scope of the claims being reserved.

1. In an electrolysis box, a tank, an inlet and an outlet for said tank, a series of anodes and cathodes in said tank formed of several kinds of metals, and a series of carbon anodes and cathodes placed in said tank to act on the liquid passing through the same subsequent to the action of the metal plates.

2. In an electrolysis box, a tank, an inlet and an outlet for said tank, a series of anodes and cathodes in said tank, said anodes and cathodes being made of iron, zinc, manganese dioxid, and aluminum, the various metals being alternately placed, and a series of carbon anodes and cathodes placed at the discharge end of the tank whereby the flocculation of the hydrous oxids of the various undesirable metals is accelerated.

In testimony whereof I have set my hand this 8" day of October A. D. 1907, in the presence of the two subscribed witnesses.

DOUGLAS L. V. BROWNE.

Witnesses:
C. P. GRIFFIN,
FRANK P. MEDINA.